(12) United States Patent
Jinbo

(10) Patent No.: US 7,214,161 B2
(45) Date of Patent: May 8, 2007

(54) ONE-WAY CLUTCH

(75) Inventor: Naoto Jinbo, Yokohama (JP)

(73) Assignee: NIFCO Inc., Yokohama (JP)

( * ) Notice: Subject to any disclaimer, the term of this patent is extended or adjusted under 35 U.S.C. 154(b) by 238 days.

(21) Appl. No.: 11/008,762

(22) Filed: Dec. 10, 2004

(65) Prior Publication Data
US 2005/0130794 A1   Jun. 16, 2005

(30) Foreign Application Priority Data
Dec. 15, 2003   (JP)   ............................. 2003-416764

(51) Int. Cl.
*F16H 57/08*   (2006.01)

(52) U.S. Cl. ...................... 475/346; 475/331; 192/3.52; 192/46

(58) Field of Classification Search .................. 475/13, 475/331, 346; 192/3.52, 41 R, 46; 101/216; 400/641
See application file for complete search history.

(56) References Cited

U.S. PATENT DOCUMENTS 5,020,648 A * 6/1991 Bush et al. .................... 192/46
6,007,263 A * 12/1999 Imai et al. .................... 400/693
6,931,954 B2 * 8/2005 Jinbo ............................ 74/64
2004/0112703 A1 * 6/2004 Kremer ....................... 192/46

FOREIGN PATENT DOCUMENTS

| GB | 1 464 873 | 2/1977 |
|----|-----------|--------|
| JP | 2525010 | 11/1996 |
| JP | 2002-340048 | 11/2002 |
| JP | 2004-19757 | 1/2004 |

* cited by examiner

*Primary Examiner*—David D. Le
(74) *Attorney, Agent, or Firm*—Manabu Kanesaka

(57) ABSTRACT

A one-way clutch includes an outer member with inner teeth; an inner member rotatably retained in the outer member concentrically with the same and having a depression formed in an outer circumference thereof; at least one planet gear loosely and rotatably retained in the depression and engaging the inner teeth; and a removed portion formed in the outer circumference of the inner member adjacent the depression. When the inner member rotates in one direction with respect to the outer member, the planet gear freely rotates inside the depression. When the inner member rotates in an opposite direction with respect to the outer member, a part of teeth of the planet gear engages the removed portion. The planet gear is retained in the depression via a moving-range regulating member for regulating a moving range of the planet gear in radial and circumferential directions.

5 Claims, 2 Drawing Sheets

ONE-WAY CLUTCH

BACKGROUND OF THE INVENTION AND RELATED ART STATEMENT

The present invention relates to a one-way clutch, especially, a one-way clutch suitable for preventing a driven side from being driven in reverse by a driving side.

In a carriage of a copy machine, for example, a one-way clutch is provided between a paper-path roller and a drive motor in order to remove a paper smoothly upon a paper jam. Such a one-way clutch includes: an outer member with inner teeth; an inner member retained in the outer member to be rotatable concentrically with the same and including a depression on an outer circumference surface thereof; and a planet gear rotatably retained in the depression for engaging the inner teeth. When the outer member is driven, a tip of a part of teeth of the planet gear engages an edge of a removed portion formed in the outer circumferential surface of the inner member at a portion adjacent to the depression. Accordingly, the outer member is connected to the inner member, thereby transmitting torque to the inner member. When the outer member stops and a rotational force is exerted on the inner member, the planet gear freely rotates inside the depression and engages the inner teeth of the outer member, thereby disconnecting the torque transmitted to the outer member (refer to Japanese Utility Model (Kokai) No. 05-22867 (FIGS. 2 to 4)).

In the one-way clutch with the planet gear, when the torque is not transmitted between the outer and inner members, the planet gear rotates inside the depression. Accordingly, a tip of the teeth of the planet gear contacts an inner circumferential surface of the depression, thereby causing a sliding noise and impairing quietness. Also, the tips of the teeth of the planet gear are worn down, thereby lowering durability.

In view of the problems described, an object of the present invention is to provide a one-way clutch with improved quietness and durability.

Further objects and advantages of the invention will be apparent from the following description of the invention.

SUMMARY OF THE INVENTION

In order to attain the objects described above, according to a first aspect of the present invention, a one-way clutch includes: an outer member with inner teeth; an inner member rotatably retained in the outer member concentrically with the same and including a depression formed in an outer circumference surface thereof; a planet gear loosely and rotatably retained in the depression and engaging the inner teeth; and a removed portion (removed surface) formed in the outer circumferential surface of the inner member at a position adjacent to the depression. When the inner member rotates in one direction with respect to the outer member, the planet gear freely rotates inside the depression. When the inner member rotates in an opposite direction with respect to the outer member, a part of teeth of the planet gear engages the removed portion. The planet gear is retained in the depression via moving-range regulating means (hole elongated in a circumferential direction) for regulating a moving range of the planet gear in radial and circumferential directions.

According to a second aspect of the present invention, a holding member is provided for supporting the planet gear together with the inner member in an axial direction. Further, an axial portion is provided in the planet gear, and is supported in a bearing hole elongated in a circumferential direction and provided in at least one of the holding member and the inner member. The elongated hole regulates the moving range of the planet gear.

In the present invention, when the planet gear rotates idle, it is possible to prevent a tip of the teeth of the planet gear from contacting an inner surface of the depression. When the planet gear rotates idle, a radial position of the planet gear is regulated. Accordingly, the planet gear can engage the inner teeth on a standard pitch circle, thereby eliminating a noise due to an irregular engagement. As a result, no sliding noise or wear of a teeth tip is generated, thereby improving quietness and durability.

DETAILED DESCRIPTION OF PREFERRED EMBODIMENTS

Figure 1:
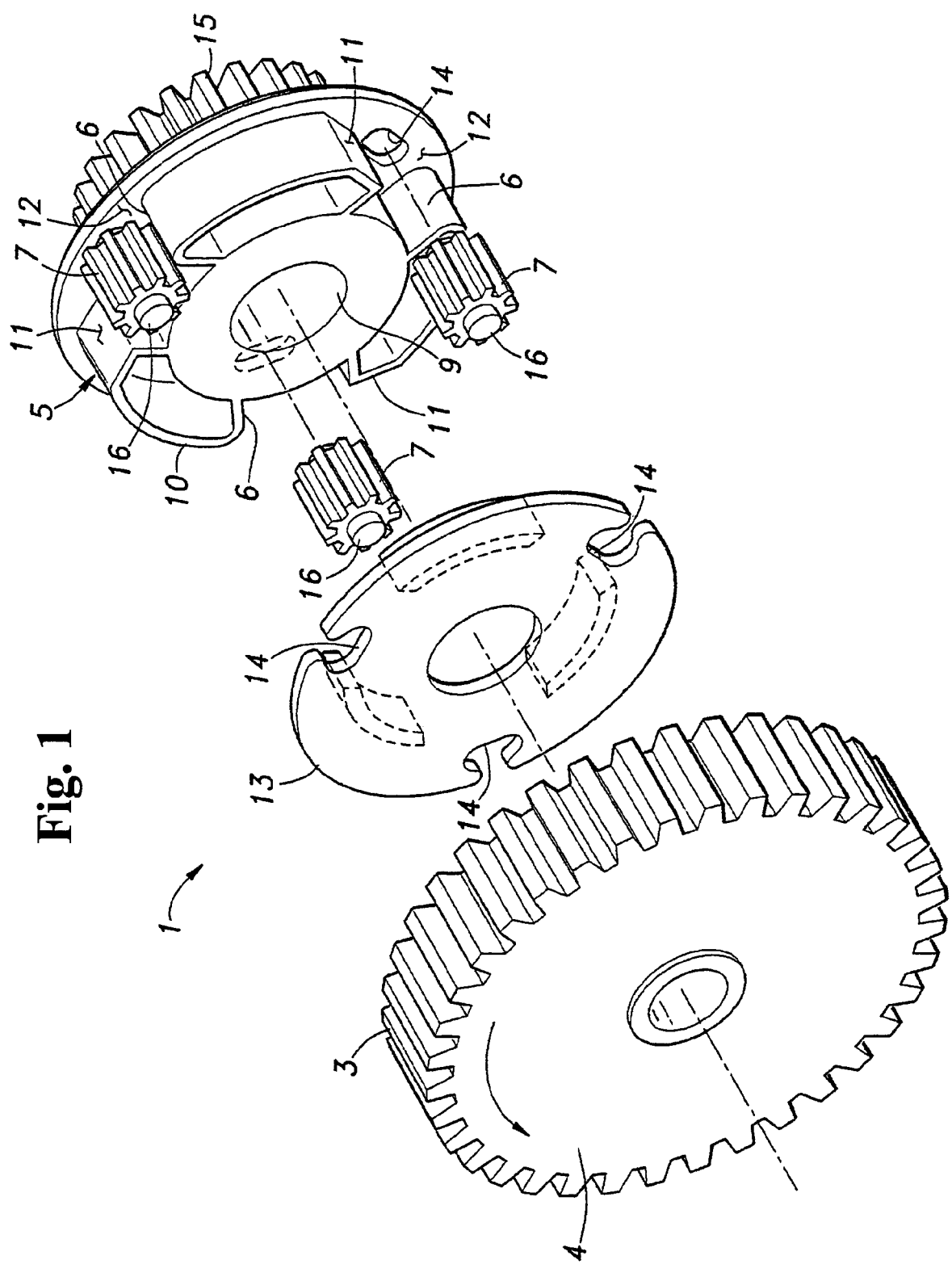
FIG. 1 is an exploded perspective view of a device according to an embodiment of the present invention.
Figure 2:
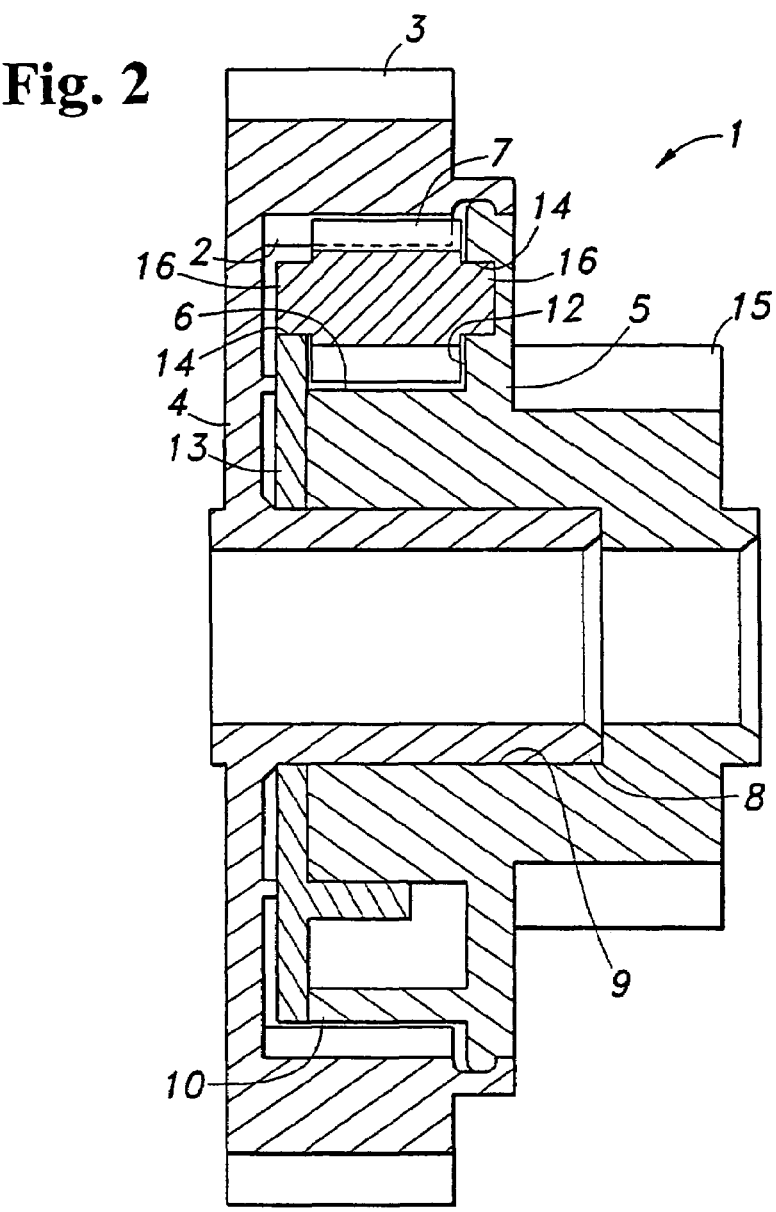
FIG. 2 is a longitudinal sectional view of the device according to the embodiment of the present invention.

Hereunder, embodiments of the present invention will be explained with reference to the attached drawings. FIG. 1 is an exploded perspective view showing components of a one-way clutch according to an embodiment of the present invention. FIG. 2 is a cross sectional view of the one-way clutch in an assembled state. A one-way clutch 1 is formed of a cylindrical outer member 4 with a shallow bottom having circular teeth 2 and 3 formed on an inner circumferential surface and an outer circumferential surface thereof, respectively; an inner member 5 retained in the inner teeth 2 of the outer member 4; and three planet gears 7 loosely retained in depressions 6 formed in the outer circumferential surface of the inner member 5 at equally divided three positions in a circumferential direction and having a rectangular shape viewed from an axial direction.

The outer member 4 and the inner member 5 are supported by an axis (not shown) in a state wherein a boss portion 8 formed at the central part of the outer member 4 is inserted in a center hole 9 of the inner member 5. The outer member 4 and the inner member 5 are combined in such a way that they are free to rotate coaxially.

The inner member 5 includes retained portions 10 aligned in a circle and retained in the outer member 4. The retained portions 10 have surfaces facing the inner teeth 2 of the outer member 4. Portions of the surfaces at front sides of the depressions 6 in a rotational direction are removed to form removed surfaces 11 in parallel to a tangent of the circle. The inner member 5 has axial-inner end surfaces of the retained portions 10 retained in the outer member 4. A holding plate 13 for supporting three planet gears 7 together with an axial-end wall 12 of the depressions 6 is attached to inner end surfaces of the retained portions 10 in an axial direction. The holding plate 13 and the axial-end wall 12 of the depressions 6 are provided with long holes 14 elongated in a circumferential direction. A pinion 15 is integrally formed on an outer end surface of the inner member 5 in the axial direction.

Short axial portions 16 project from both sides of the planet gears 7 in an axial direction thereof. The axial portions 16 engage the long holes 14 elongated in the circumferential direction and formed in the holding plate 13 and the axial-end wall 12 of the depressions 6. Accordingly, the planet gears 7 are regulated to move inside the depressions 6 within a limited moving range in radial and circumferential directions. That is, the planet gears 7 do not shift toward inside in the radial direction, and only shift within a predetermined moving range in the circumferential direction.

The depressions 6 and the long holes 14 are situated as follows. When the axial portions 16 are shifted toward a back side of the long holes 14 in the rotational direction, the tips of the teeth of the planet gears 7 do not contact edges 17 between the depressions 6 and the removed surfaces 11. When the axial portions 16 are shifted toward a front side of the long holes 14 in the rotational direction, the tips of the teeth of the planet gears 7 engage the edges 17.

Figure 3:
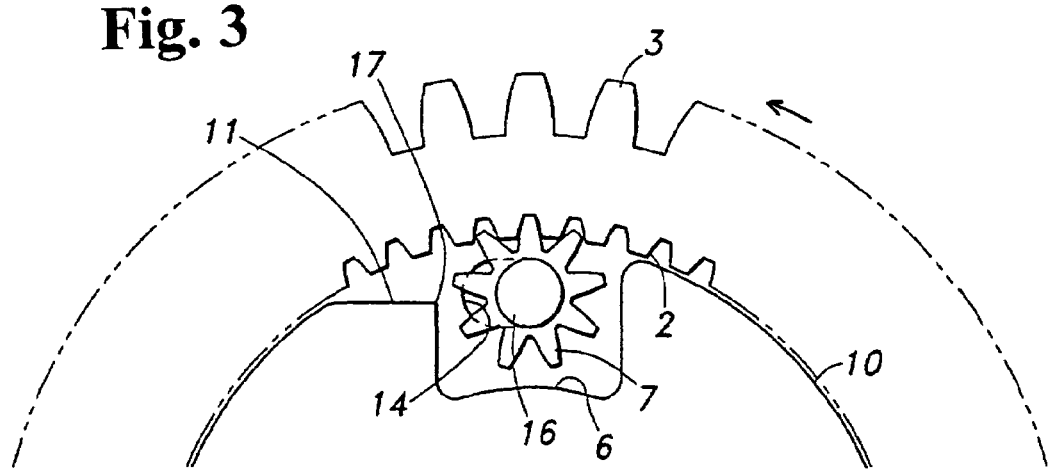
FIG. 3 is a view for explaining an operation of the device according to the embodiment of the present invention.

An operation of the device of the present invention applied to a paper-path mechanism of a copy machine will be explained next. As an example, a driving force of an electric motor is applied to the external teeth 3 of the outer member 4, and a paper feed roller is connected to the pinion 15 of the inner member 5. When the inner member 5 is stationary and the outer member 4 is driven in an arrow direction in FIG. 3 (counterclockwise), the planet gears 7 engaging the inner teeth 2 try to rotate in the same direction while moving inside the long holes 14 in the arrow direction. As a result, tips of the teeth of the planet gears 7 engage the edges 17 between the depressions 6 and the removed surfaces 11. Accordingly, the planet gears 7 are locked between the inner teeth 2 and the depressions 6, and the inner member 5 and the outer member 4 are connected. Therefore, the driving force applied to the outer member 4 is transmitted to the inner member 5, and the paper feed roller rotates to feed a paper.

In a case of a paper jam, it is necessary to stop the electric motor and remove a jammed paper in the paper feed roller. In this case, when the jammed paper is pulled out, the paper feed roller rotates and a rotational force in the arrow direction acts on the inner member 5. That is, the outer member 4 is driven in reverse by the inner member 5, i.e., a driven member, from a state that the planet gears 7 are stationary together with the outer member 4. At this time, the inner member 5 rotates and the axial portions 16 are pushed by the inner surfaces of the long holes 14 at a back side in the rotational direction, so that the tips of the teeth of the planet gears 7 come off the edges 17 between the depressions 6 and the removed surfaces 11. Accordingly, the planet gears 7 rotate freely, and the rotational force of the inner member 5 is not transmitted to the outer member 4. The inner member 5 rotates idle, and the jammed paper can be easily pulled out.

When the planet gears 7 rotate idle, the planet gears 7 do not contact the depressions 6, thereby eliminating a sliding noise and frictional wear of the teeth tips.

The driving member and the driven member are not limited to the embodiment described above, and the inner member 5 can be the driving member within a limit of appropriate design change.

The one-way clutch of the present invention can improve quietness and durability, and be extensively applied to a driving force channel for regulating transmission in one direction.

The disclosure of Japanese Patent Application No. 2003-416764, filed on Dec. 15, 2003, is incorporated in the application.

While the invention has been explained with reference to the specific embodiments of the invention, the explanation is illustrative and the invention is limited only by the appended claims.

What is claimed is:

1. A one-way clutch comprising:
   a outer member with inner teeth,
   an inner member rotatably disposed in the outer member and having at least one depression formed in an outer periphery thereof, and a removed portion formed in the outer periphery adjacent the depression,
   at least one planet gear rotatably retained in the depression to engage the inner teeth,
   moving-range regulating means for receiving the planet gear retained in the depression, said moving-range regulating means limiting the planet gear to move within a limited range in radial and circumferential directions so that when the inner member rotates in one direction relative to the outer member, the planet gear freely rotates inside the depression, and when the inner member rotates in an opposite direction relative to the outer member, the planet gear engages an edge of the removed portion not to freely rotate in the depression, and
   a holding member for supporting the planet gear together with the inner member, said planet gear having an axial portion, at least one of said holding member and said inner member having an elongated hole for receiving the axial portion so that the planet gear moves within the limited range.

2. A one-way clutch according to claim 1, wherein said elongated hole constitutes the moving-range regulating means.

3. A one-way clutch according to claim 1, wherein said inner member includes an end wall at one side thereof, and said holding member is located at a side opposite to the end wall, each of said end wall and holding member having said elongated hole for receiving the axial portion of the planet gear.

4. A one-way clutch according to claim 3, wherein said outer member includes a side depression, in which said inner member is located, and a peripheral side wall surrounding the side depression and having said inner teeth at an inner periphery thereof.

5. A one-way clutch according to claim 4, wherein a plurality of planet gears is arranged around the inner member to be equally spaced from each other.

* * * * *